US012574228B2

(12) United States Patent
Macchetti et al.

(10) Patent No.: US 12,574,228 B2
(45) Date of Patent: Mar. 10, 2026

(54) DEVICE FOR GENERATING AT LEAST ONE CRYPTOGRAPHIC KEY, CORRESPONDING METHODS AND COMPUTER PROGRAM PRODUCTS

(71) Applicant: NAGRAVISION, SARL, Cheseaux-sur-Lausanne (CH)

(72) Inventors: Marco Macchetti, Cheseaux-sur-Lausanne (CH); Jerome Perrine, Cheseaux-sur-Lausanne (CH); Didier Hunacek, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 194 days.

(21) Appl. No.: 18/044,603

(22) PCT Filed: Sep. 10, 2021

(86) PCT No.: PCT/EP2021/074885
§ 371 (c)(1),
(2) Date: Mar. 9, 2023

(87) PCT Pub. No.: WO2022/053591
PCT Pub. Date: Mar. 17, 2022

(65) Prior Publication Data
US 2023/0344625 A1 Oct. 26, 2023

(30) Foreign Application Priority Data

Sep. 10, 2020 (EP) ..................................... 20195584

(51) Int. Cl.
*H04L 9/08* (2006.01)
*H04L 9/14* (2006.01)
*H04L 9/32* (2006.01)

(52) U.S. Cl.
CPC .............. *H04L 9/0866* (2013.01); *H04L 9/14* (2013.01); *H04L 9/0861* (2013.01); *H04L 9/0869* (2013.01); *H04L 9/3278* (2013.01)

(58) Field of Classification Search
CPC ....... H04L 9/0866; H04L 9/14; H04L 9/0861; H04L 9/0869; H04L 9/3278; H04L 2209/60; G09C 1/00
See application file for complete search history.

(56) References Cited

U.S. PATENT DOCUMENTS

| | | | | |
|---|---|---|---|---|
| 2009/0060197 | A1* | 3/2009 | Taylor | H04L 9/0844 380/29 |
| 2013/0142329 | A1* | 6/2013 | Bell | H04L 9/0866 380/44 |

(Continued)

OTHER PUBLICATIONS

International Search Report and Written Opinion mailed on Dec. 14, 2021 in PCT/EP2021/074885 filed on Sep. 10, 2021 (citing references 1-2 therein, 11 pages).

*Primary Examiner* — Shaqueal D Wade-Wright
(74) *Attorney, Agent, or Firm* — Maier & Maier, PLLC

(57) ABSTRACT

A device for generating at least one cryptographic key by selecting at least three input data selected among, on one hand, a predetermined data and, on the other hand, a function of at least one piece of data having a type belonging to the group including: a physical unclonable type, corresponding to physical unclonable function data, a hardwired type, corresponding to data hardwired within said device, and a software type, corresponding to software data, assembling the at least three input data to produce an assembled input data, and applying the assembled input data into a cryptographic element to produce a cryptographic key.

20 Claims, 4 Drawing Sheets

(56)  References Cited

U.S. PATENT DOCUMENTS

| 2019/0342090 A1* | 11/2019 | Pisasale | ............... | H04L 9/0894 |
| 2020/0313911 A1* | 10/2020 | Mondello | ............. | H04L 9/3268 |
| 2023/0205860 A1* | 6/2023 | Mao | ........................ | G06F 21/10 |
| | | | | 726/16 |

* cited by examiner

100

502

500

μP

ROM          RAM 501          503

DEVICE FOR GENERATING AT LEAST ONE CRYPTOGRAPHIC KEY, CORRESPONDING METHODS AND COMPUTER PROGRAM PRODUCTS

1. FIELD OF THE DISCLOSURE

The field of the disclosure is that of encryption and decryption of data.

More specifically, the disclosure relates to methods for generating cryptographic keys and to the use of such keys for encryption and decryption of data.

The disclosure can be of interest in any field where such data has to be encrypted and decrypted, in particular when different parties are involved in different stages of the encryption and decryption process. This is the case for instance in the context of diffusion of content (e.g. a multimedia content, a video content, etc.) in a pay-TV system.

2. TECHNOLOGICAL BACKGROUND

The generation of a cryptographic key classically involves secret data that are applied to a cryptographic element. Such cryptographic element is a piece of hardware or of software that implements e.g. a one-way function that generates the cryptographic key based on the secret data.

The device that implements such cryptographic element classically takes the form of a system on chip, or SoC, integrated circuit. In order to avoid what we call replay attacks (using a cloning device), the secret data shall be stored in a non-modifiable memory and this memory shall not be easily replaceable. Therefore, this memory shall be embedded in the SoC design.

Conversely, a party that behaves as a root authority may want to use its own secret data for generating customized cryptographic key. For this reason, the supplier that produces the SoC has often to take into account for the secret data of the root authority that will acquire the SoC. In order to address such request, secret data are often stored in programmable memory of the SoC such as:

Flash memory; or

One-time programmable (OTP) memory, for instance anti-fuse or fuse technology.

However, both of these technologies have their own disadvantages when they are embedded in the SoC. Flash memories are not shrinkable as fast as the SoC technology. Therefore, to embed flash memories inside a SoC, it is very expensive because two technologies shall be used. Even sometimes, it is not possible. For the OTP technology, it is a question of space used inside the SoC and some of these technologies are subject to royalties. Once again, it is very costly.

Other technics can be considered for embedding the secret data in the SoC, e.g. by embedding the data in the netlist of the design itself. In that case, the design is shrinkable as fast as the SoC technology. However, the customization of the secret data still remains costly for the SoC manufacturer due to the necessary customization of the manufacturing quality tests.

There is thus a need for a solution for reducing the cost of a device, e.g. a SoC, used for the generation of the cryptographic keys while allowing customization of said keys.

3. SUMMARY

A particular aspect of the present disclosure relates to a device for generating at least one cryptographic key. The device comprises at least one cryptographic element. Such device is configured for implementing at least one generation of a cryptographic key comprising:

selecting at least three input data, each of the at least three input data being selected among, on one hand, a predetermined data and, on the other hand, a function of at least one piece of data having a type belonging to the group comprising:

a physical unclonable type, corresponding to physical unclonable function data;

a hardwired type, corresponding to data hardwired within the device; and a software type, corresponding to software data, assembling the at least three input data to produce an assembled input data; and applying the assembled input data into a cryptographic element to produce the cryptographic key.

Thus, the present disclosure proposes a new and inventive solution for reducing the cost of the device (e.g. a SoC) used for the generation of the cryptographic keys while allowing customization of the keys.

More particularly, the input data used for generating the cryptographic keys are of types that do not necessarily require customizing the hardware structure of the device for an end-user willing to generate customized cryptographic keys. Indeed, even in case the hardwired type data are common to all the devices of a given serial (i.e. to devices produced in mass based on a same template), customized cryptographic keys can be obtained thanks to the flexibility in the assembling with other secret data, like the data of physical unclonable type or of software type.

Consequently, the manufacturing of the device can be simplified and thus the cost of the device reduced.

In some embodiments, the device is configured for implementing three of the generation of a cryptographic key implemented successively for producing a sequence of three cryptographic keys, at least one cryptographic key of given rank in the sequence being a function at least of an input data selected among, on one hand, a given predetermined data and, on the other hand, a cryptographic key of a previous rank in the sequence.

Thus, a key ladder can be implemented when a cryptographic key of given rank is a function of a cryptographic key of a previous rank.

In some embodiments, the device is configured for implementing a first generation of a first cryptographic key comprising selecting at least three first input data being:

a first predetermined data or a first data of physical unclonable type;

a second predetermined data or a second data of the hardwired type; and a third predetermined data or a third data of the software type.

Assembling the at least three first input data produces an assembled first input data. Applying the assembled first input data into a first cryptographic element produces the first cryptographic key.

Thus, a first cryptographic key is generated. For instance, the at least three first input data can be secret data held by a root authority. The first cryptographic key can be provided to third parties for further encryption/decryption.

In some embodiments, the device is configured for implementing a second generation of a second cryptographic key comprising selecting at least three second input data being:

a fourth predetermined data or a fourth data of the physical unclonable type;

a fifth predetermined data or the first cryptographic key; and a sixth predetermined data or a fifth data of the software type.

Assembling the at least three second input data produces an assembled second input data. Applying the assembled second input data into a second cryptographic element produces the second cryptographic key.

Thus, a second cryptographic key is generated. For instance, the second cryptographic key is generated by the third parties. However, such generation by the third parties can be done without having the knowledge of the secret data held by the root authority, only by configuring properly the device.

In some embodiments, the device is configured for implementing a third generation of a third cryptographic key comprising selecting at least three third input data being:

a seventh predetermined data or a sixth data of the physical unclonable type;

a eighth predetermined data or the second cryptographic key; and a ninth predetermined data or a seventh data of the software type.

Assembling the at least three third input data produces an assembled third input data. Applying the assembled third input data into a third cryptographic element produces the third cryptographic key.

Thus, a third cryptographic key is generated. For instance, the third cryptographic key is generated by customers of the third parties without having the knowledge of the secret data held by the root authority, or of any of the first and second cryptographic keys, only by configuring properly the device.

In some embodiments, the fourth data and the sixth data are a same public data of the physical unclonable type.

In some embodiments, the first generation of a first cryptographic key comprises selecting five first input data being the three first input data discussed above and:

a tenth predetermined data or a private data of the physical unclonable type; and an eleventh predetermined data or a private data of the hardwired type;

Assembling the five first input data produces the assembled first input data.

In some embodiments, the fifth data of the software type is different from the first software data of the software type.

Thus, a segmentation of the generated cryptographic keys can be done between different parties by using different data of software type for different parties.

In some embodiments, the cryptographic element implements a one-way function to produce the cryptographic key based on the input data.

For instance, the one-way function is a Secure Hash Algorithm type one-way function (e.g. SHA-256, HMAC-SHA256, . . . ) or a custom one-way function.

Another aspect of the present disclosure relates to a method for generating at least one cryptographic key by the device for generating at least one cryptographic key according to the present disclosure (in any of its different embodiments). The features and advantages of this method are thus the same as those of the device for generating at least one cryptographic key according to the present disclosure (in any of its different embodiments). Therefore, they are not detailed any further.

Another aspect of the present disclosure relates to a method for deciphering encrypted data. Such method comprises:

generating at least one cryptographic key by implementing the method for generating at least one cryptographic key detailed above (in any of its different embodiments);

deciphering the encrypted data by implementing a decryption algorithm using the at least one cryptographic key.

In some embodiments, the encrypted data comprise an identifier. The method for generating comprises a first generation of a first cryptographic key comprising selecting at least three first input data being:

a first predetermined data or a first data of physical unclonable type;

a second predetermined data or a second data of the hardwired type; and a third predetermined data or a third data of the software type.

Assembling the at least three first input data produces an assembled first input data. Applying the assembled first input data into a first cryptographic element produces the first cryptographic key. The method for generating further comprises a second cryptographic key comprising selecting at least three second input data being:

a fourth predetermined data or a fourth data of the physical unclonable type;

a fifth predetermined data or the first cryptographic key; and a sixth predetermined data or a fifth data of the software type.

Assembling the at least three second input data produces an assembled second input data. Applying the assembled second input data into a second cryptographic element produces the second cryptographic key. The method for generating further comprises a third generation of a third cryptographic key comprising selecting at least three third input data being:

a seventh predetermined data or a sixth data of the physical unclonable type;

a eighth predetermined data or the second cryptographic key; and a ninth predetermined data or a seventh data of the software type.

Assembling the at least three third input data produces an assembled third input data. Applying the assembled third input data into a third cryptographic element produces the third cryptographic key. The method for deciphering comprises comparing the identifier and the seventh data of the software type delivering a comparison result. Deciphering the encrypted data being implemented only if the comparison result is representative that the seventh data is equal to the identifier.

Thus, the decryption is further secured.

Another aspect of the present disclosure relates to a computer program product comprising program code instructions for implementing the above-mentioned method for generating at least one cryptographic key (in any of its different embodiments) and/or for implementing the above-mentioned method for deciphering encrypted data (in any of its different embodiments), when said program is executed on a computer or a processor.

4. LIST OF FIGURES

Other features and advantages of embodiments shall appear from the following description, given by way of indicative and non-exhaustive examples and from the appended drawings, of which:

5. DETAILED DESCRIPTION

In all of the figures of the present document, the same numerical reference signs designate similar elements and steps.

Figure 1:
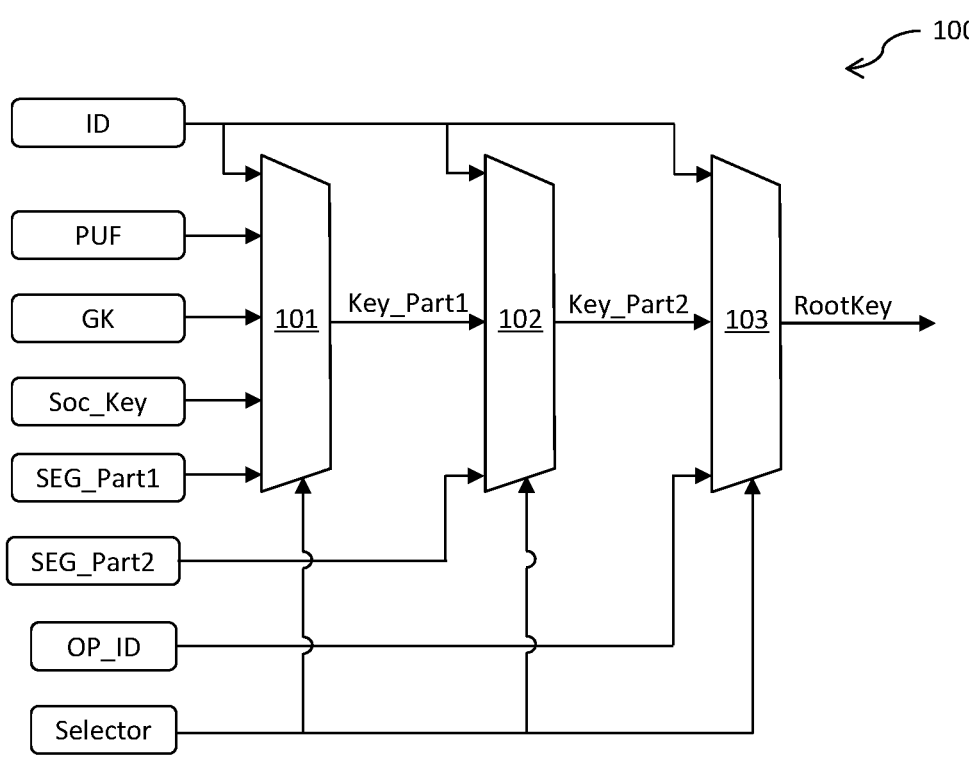
FIG. 1 illustrates a device for generating at least one cryptographic key according to one embodiment of the present disclosure.

The disclosed technique relates to a device for generating one or more cryptographic keys. More particularly, such device is configured for generating the keys based on the selection of various input data that are of types that do not necessarily require customizing the hardware structure of the device for an end-user willing to generate customized cryptographic keys. Such types, detailed more precisely below in relation with FIG. 1, are physical unclonable type, hardwired type and software type. Thus, even in case the hardwired type data are common to all the devices of a given serial (i.e. to devices mass produced based on a same template), customized cryptographic keys can be obtained thanks to the flexibility in the assembling with other secret data. The mass production of the device can be simplified and thus the cost of the device reduced.

Referring now to FIG. 1, we illustrate a device 100 for generating at least one cryptographic key according to one embodiment of the present disclosure. The device 100 is configured for implementing the method MFG200 for generating cryptographic keys illustrated in FIG. 2.

The device 100 comprises three cryptographic elements 101, 102, 103 and is configured for generating the three cryptographic keys Key_Part1, Key_Part2 and RootKey based on input data having a type belonging to the group comprising: physical unclonable type, hardwired type, and software type. More particularly:

data of physical unclonable type are data generated by a physical unclonable function embedded in the SoC. Such physical unclonable function is a physical object (e.g. based on a ring oscillator) that for a given input and physical conditions, provides a physically-defined output. The data generated by physical unclonable functions depend on the uniqueness of their physical microstructure. This microstructure depends on random physical factors introduced during manufacturing. These factors are unpredictable and uncontrollable, which makes it virtually impossible to duplicate or clone the structure;

data of hardwired type are data hardwired in the device 100. It can be for instance data embedded in an OTP memory or data dispersed in the netlist of the device 100; and data of software type are data downloaded into the device 100 in a non-persistent memory. Such type of data provides flexibility in the generation of the cryptographic keys, e.g. for segmenting the generated cryptographic keys by using different data of software type for different parties as detailed below in relation with FIGS. 4a to 4c.

The device 100 is configured for generating the three cryptographic keys Key_Part1, Key_Part2 and RootKey by implementing three phases P200 of generation of a corresponding cryptographic key.

First Implementation of a Phase P200 for Generating the First Cryptographic Keys Key_Part1:

In a step S210, the device 100 selects five first input data. Each first input data is selected as a predetermined data or as a data of a type detailed above (physical unclonable type, hardwired type or software type) based on a corresponding selection parameter Selector. More particularly:

two of the first input data are selected as a predetermined data or as a physical unclonable type data PUF, ID;

two of the first input data are selected as a predetermined data or as a hardwired type data GK, Soc_Key; and one of the first input data is selected as a predetermined data or as a software type data Seg_Part1.

For instance, the two physical unclonable type data PUF and ID are the private and public keys of a key pair. This allows for instance a root authority to keep secret the private part of the key pair while distributing the public part to third parties. The same holds for the two hardwired type data GK and Soc_Key that can be private and public keys of a key pair.

The predetermined data are constant data that can be used in place of the data of the three types detailed above. The predetermined data can be the same for all input data or they can be different. The use of such predetermined data allows having each time the same amount of data after selection of the input data, whatever the configuration of the selection parameter Selector. This allows having the same size of data after the assembling of the selected input data (step S220 below) and thus at the input of the cryptographic element (step S230 below). Indeed, it is recommended to have a fixed size of bytes as input of cryptographic functions, e.g. for preventing different behaviors for security reasons.

Depending on the final application, the selection parameter Selector can be indicated by hardwired value (e.g. implemented during manufacturing of the device) or on the fly with its associated key that should be deciphered (e.g. as in the use case detailed below in relation with FIGS. 4a, 4b and 4c). For instance, the selection parameter Selector can be indicated by the driver which is in charge of configuring the device 100 depending on the application. There is no security issue because if the selection parameter Selector is wrong the output key will be also wrong and the content will be not correctly deciphered.

Figure 2:
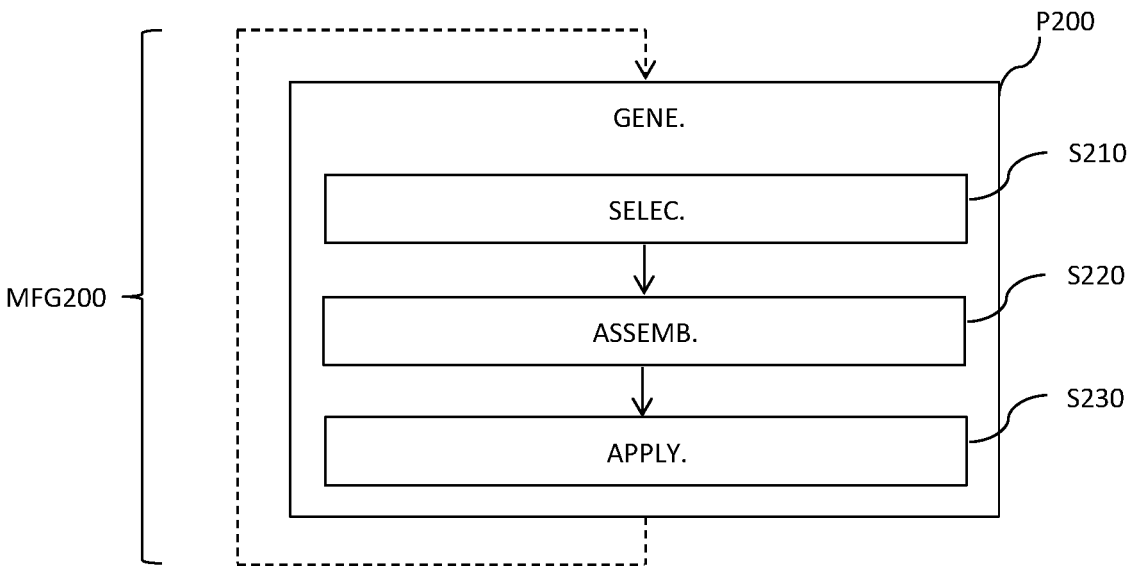
FIG. 2 illustrates a flowchart of a method for generating at least one cryptographic key by the device of FIG. 1 according to one embodiment of the present disclosure.

Back to FIG. 2, in a step S220, the device 100 assembles the five first input data selected in step S210 to produce an assembled first input data. For instance, the assembled first input data results of the concatenation of the five first input data.

In a step S230, the device 100 applies the assembled first input data into a first cryptographic element 101 to produce the first cryptographic key Key_Part1.

Second Implementation of the Phase P200 for Generating the Second Cryptographic Keys Key_Part2:

During a new implementation of the step S210, the device 100 selects three second input data being:

a predetermined data or a data of the physical unclonable type ID;

a predetermined data or the first cryptographic key Key_Part1; and a predetermined data or a data of the software type Seg_Part2.

During a new implementation of the step S220, the device 100 assembles the three second input data selected in step S210 to produce an assembled second input data.

During step S230, the device 100 applies the assembled second input data into a second cryptographic element 102 to produce the second cryptographic key Key_Part2.

Third Implementation of the Phase P200 Implemented for Generating the Third Cryptographic Key RootKey:

During a new implementation of the step S210, the device 100 selects three third input data being:

a predetermined data or a data of the physical unclonable type ID;

a predetermined data or the second cryptographic key Key_Part2; and a predetermined data or a data of the software type OP_ID.

During a new implementation of the step S220, the device 100 assembles the three third input data selected in step S210 to produce an assembled third input data.

During a new implementation of the step S230, the device 100 applies the assembled third input data into a third cryptographic element 102 to produce the third cryptographic key RootKey.

More particularly, the cryptographic elements 101, 102, 103 are pieces of hardware (e.g. a dedicated machine or component, such as an FPGA (Field Programmable Gate Array), an ASIC (Application-Specific Integrated Circuit) or any dedicated hardware component) or of software (e.g. executed by one or more processor or DSP (digital signal processor)) that implement e.g. a one way function that generates the corresponding cryptographic keys Key_Part1, Key_Part2, RootKey based on the associated assembled input data.

A one-way function is a function that is easy to compute on every input, but hard to invert given the image of a random input. Here, "easy" and "hard" are to be understood in the sense of computational complexity theory, specifically the theory of polynomial time problems. The one-way functions when implemented in the cryptographic elements 101, 102, 103 can be custom or standard one-way functions (e.g. SHA-256, HMAC-SHA256, . . . ).

In some embodiments, the predetermined data may have the same size as the data of the three types detailed above (physical unclonable type, hardwired type or software type). This allows having assembled input data of the same size whatever the data of the three types are selected or not. This allows applying a same one-way function to the assembled input data whatever the selection of the input data.

Back to FIG. 2, the three phases P200 are implemented successively for producing a sequence of three cryptographic keys Key_Part1, Key_Part2, RootKey. Depending on the configuration of the selection parameter Selector, one or more cryptographic key of given rank in the sequence is a function at least of an input data selected among, on one hand, a given predetermined data and, on the other hand, a cryptographic key of a previous rank in the sequence.

In some embodiments, the first cryptographic keys Key_Part1 is produced based on three input data being:

a predetermined data or a data of the physical unclonable type;

a predetermined data or a data of the hardwired type data; and a predetermined data or a data of the software type data.

In some embodiments, the first cryptographic keys Key_Part1 is produced based on additional first input data on top of those three input data.

In some embodiments, the device 100 is configured for implementing at least one phases P200 for generating a corresponding cryptographic key. In that case, the device 100 selects in step S210 at least three input data, each of the at least three input data being selected among, on one hand, a predetermined data and, on the other hand, a function of at least one piece of data having a type a data of a type detailed above (physical unclonable type, hardwired type or software type).

Figure 3:
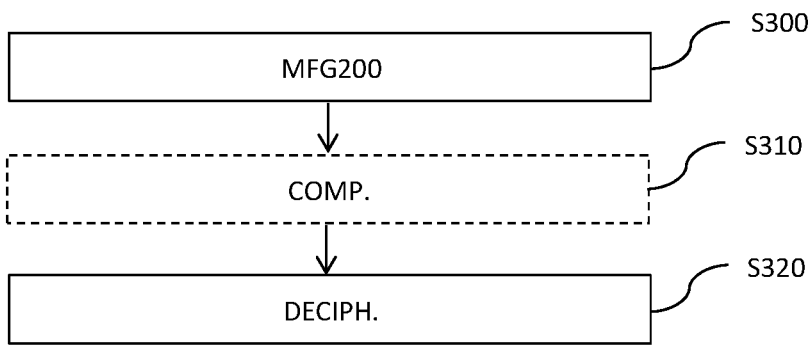
FIG. 3 illustrates a flowchart of a method for deciphering data that had been encrypted using a cryptographic key generated by the method of FIG. 2 according to one embodiment of the present disclosure.

Referring now to FIG. 3, we illustrate a flowchart of a method for deciphering encrypted data. More particularly, the encrypted data result of the encryption of raw data using at least one cryptographic key generated by the device 100 implementing the method MFG200 for generating cryptographic keys.

In a step S300, at least one cryptographic key is generated by the device 100 implementing the method MFG200 for generating cryptographic keys (according to any of the embodiments discussed above in relation with FIG. 1 and FIG. 2).

In a step S320, the encrypted data is deciphered using the at least one cryptographic key generated in step S300, e.g. by implementing a standard (e.g. SHA-256, where SHA stands for "Secure Hash Algorithm") or a custom decryption algorithm (e.g. Hash constructions based on proprietary algorithms).

As discussed below in relation with FIGS. 4a to 4c, the at least one cryptographic key generated in step S300 may be the same or complementary keys (e.g. a public/private key pair) as the cryptographic keys used for generating the encrypted data. This may require sharing data between the parties in charge of the encryption and decryption, e.g. in a key ladder perspective.

In some embodiments discussed above in relation with FIG. 1 and FIG. 2, the device 100 implements a third phase P200 wherein one of the third input data is a predetermined data or the data of the software type OP_ID. In that case, when the encrypted data comprises an identifier, during a step S310 the identifier and the data of the software type OP_ID are compared for delivering a comparison result. The step S320 is implemented only if the comparison result is representative that the data of the software type OP_ID is equal to the identifier. Thus, the decryption is further secured.

In some embodiments, the device 100 is configured for implementing the method MFG200 and at least one of the steps S310 and S320.

Figure 4A:
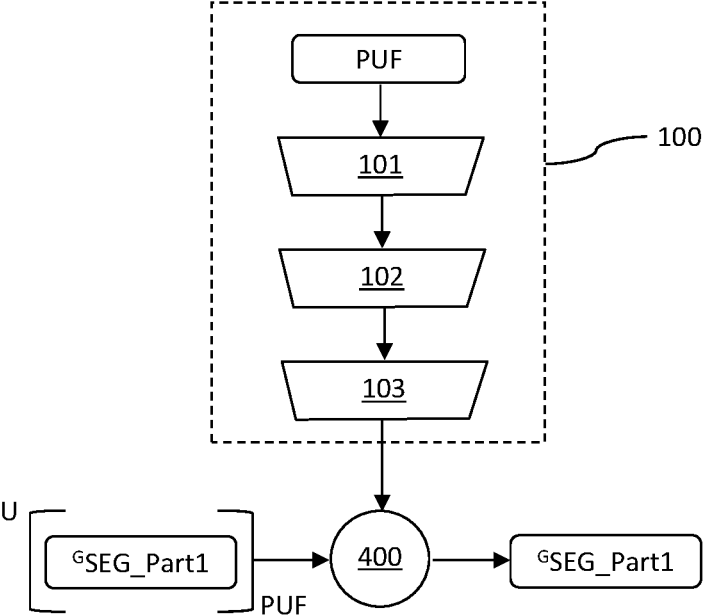
FIGS. 4a, 4b and 4c illustrate the use of the device of FIG. 1 to decipher encrypted data in the context of implementing a key ladder.
Figure 4B:
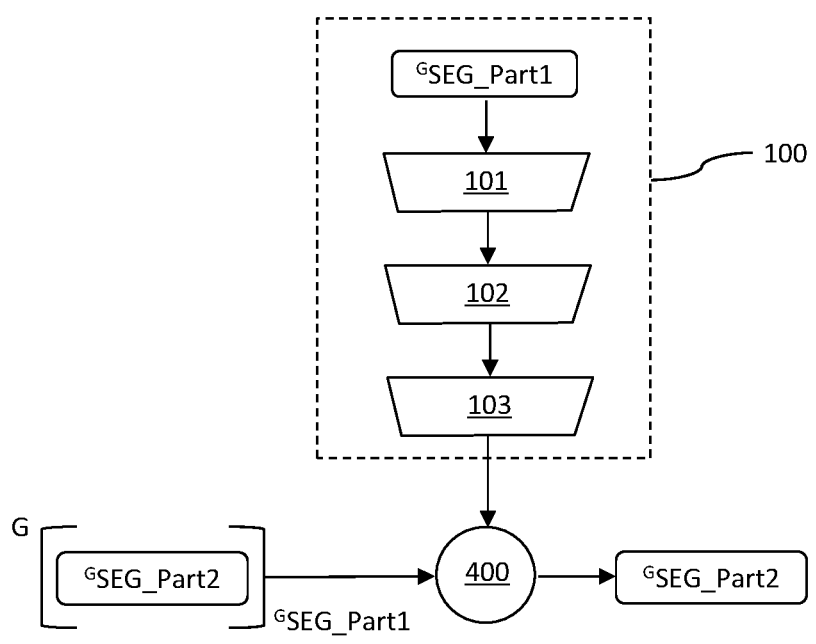
Figure 4C:
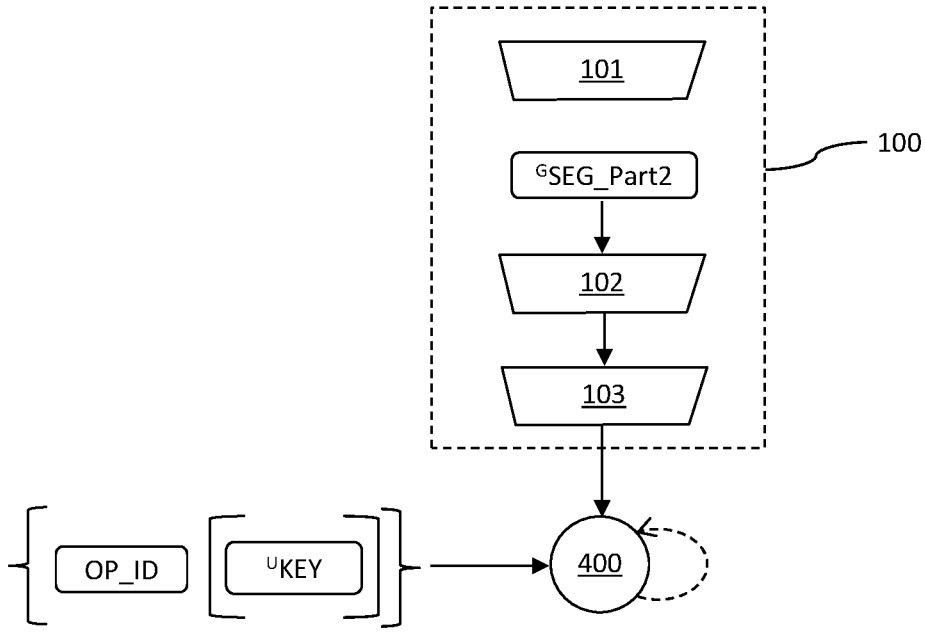

Referring now to FIGS. 4a, 4b and 4c, we illustrate the use of the device 100 to decipher encrypted data in the context of implementing a key ladder.

For instance, let assume that a first party holds the first input data of the device 100 as secret data. The one-way function implemented in the cryptographic element 101 will be a custom one and will have as inputs ID, PUF, GK, SoC_Key and SEG_PART1. Thanks to the selection parameter Selector, any combination of those inputs could be used by the one-way function to generate the Key-Part1. If an input is not selected, it is replaced by a predetermined data. This custom one-way function and the input secret data will never be provided outside of the first party. The first party will provide only the Key-Part1 or the encrypted form of the SEG_PART2 to a second party (e.g. a trusted entity).

The second party will hold the second one-way function implemented in the cryptographic element 102. This second one-way function will have as possible inputs Key-Part1, ID and the SEG-Part2. The second one-way function could be a standard one-way function (SHA-256, HMAC-SHA256, . . . ) or a custom function. Thanks to the selection parameter Selector, any combination of those inputs could be used by the second one-way function to generate the Key-Part2. If an input is not selected, it is replaced by a predetermined data. The second party will provide only the Key-Part2 or to a third party (e.g. a trusted entity).

The third party will hold the third one-way function implemented in the cryptographic element 103. This third one-way function will have as possible input Key-Part2, ID and the OP_ID. The third one-way function is a standard (SHA-256, HMAC-SHA256, . . . ) one-way function. Thanks to the selection parameter Selector, any combination of those inputs could be used by the third one-way function to generate the RootKey. If an input is not selected, it is replaced by a predetermined data. The third party is able to compute any RootKey by itself without having to know the secret data and the one-way custom function held by the first party and the second party.

For instance, in the context of pay-TV:

the first party could be the root authority;

the second party could be the content provider; and the third party could be a given operator delivering the content (e.g. a multimedia content, a video content, etc.) of the content provider to end users.

More particularly, using the device 100, the root authority ciphers and signs all the $^G$SEG_Part1s attributed to the content provider based on the unique PUFs per SoC (assuming for the sake of simplicity that only the PUF data is used as a first input data in addition to predetermined data used as other first input data for generating the keys) and the custom one-way function implemented in the cryptographic element 101. All those encrypted $^G$SEG_Part1s are stored on a ProVisioning Server (PVS). The root authority ciphers and signs the $^G$SEG_Part2 attributed to the content provider based on the $^G$SEG-Part1 and delivers securely the clear-text form of $^G$SEG_Part2 to servers of the content provider.

Now, for each authenticated end-user from the given operator (identified by OP_ID), the content provider shall request the encrypted form of the $^G$SEG_Part1s to the PVS and shall produce the key packages (licenses) as a function of the $^G$SEG_Part2, ID and OP_ID using the device 100. The content provider is able to compute the key packages by himself because he knows all the necessary inputs and the standard one-way function implemented on the second cryptographic element 102. The secret data PUF and $^G$SEG_Part1s are never exposed outside the root authority. The content provider shall deliver to the end-user the following values:

The encrypted form of $^G$SEG_Part1;

The encrypted form of $^G$SEG_Part2;

OP_ID; and

The key packages (licenses).

The end-user shall thus use the device 100 to decipher the content provided by the content provider.

For that, the end-user shall first decipher the $^G$SEG_Part1. As discussed above, we assume for sake of simplicity that the Key_Part1 key has been generated based on a PUF first input data only (i.e. the other first inputs of the device 100 are set to the corresponding predetermined data). The end-user shall thus generate with the device 100 the key corresponding to the PUF input data (by using the corresponding selection parameter Selector). The key is provided to a deciphering block 400 as well as the encrypted $^U[^G$SEG_Part1$]_{PUF}$ for providing the deciphered key $^G$SEG_Part1 (FIG. 4$a$).

Then, the end-user deciphers the $^G$SEG_Part2 key ciphered based on the $^G$SEG-Part1. The end-user shall thus generate with the device 100 the key corresponding to the $^G$SEG_Part2 key (by using the corresponding selection parameter Selector). The Key is provided to the deciphering block 400 as well as the encrypted $^G[^G$SEG_Part2$]_{G_{SEG\_Part}}$1 for providing the deciphered $^G$SEG_Part2 key (FIG. 4$b$).

Finally, the end-user uses the $^G$SEG_Part2 key to decipher the key package [$^U$KEY] ciphered based on the $^G$SEG-Part1 and $^G$SEG-Part2. Assuming that the keys of the key package have been generated by using the ID and OP_ID as third input data, the same settings are used by the end-user by setting correspondingly the selection parameter Selector.

In some embodiments discussed above in relation with FIG. 3 where the encrypted data comprises an identifier, e.g. OP_ID, the keys are authenticated and deciphered only if the identifier contained in the key corresponds to the OP_ID used by the device 100. This mechanism may be embedded into the device 100. In that case, it avoids playing with the input data, which prevents from DPA (for "differential power analysis") attacks.

Figure 5:
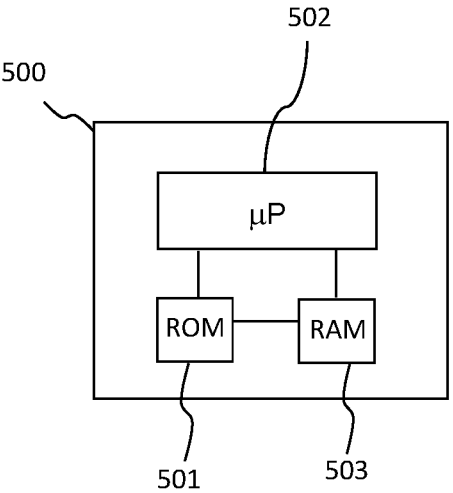
FIG. 5 illustrates an exemplary device that can be used for implementing the method of FIG. 2 and/or the method of FIG. 3.

Referring now to FIG. 5, we illustrate the structural blocks of an exemplary device 500 that can be used for implementing the method for generating at least one cryptographic key and/or the method for deciphering encrypted data according to the disclosure (according to any of the embodiments disclosed above).

In an embodiment, a device 500 comprises a non-volatile memory 503 (e.g. a read-only memory (ROM), a hard disk, a flash memory, etc.), a volatile memory 501 (e.g. a random-access memory or RAM) and a processor 502. The non-volatile memory 503 is a non-transitory computer-readable carrier medium. It stores executable program code instructions, which are executed by the processor 502 in order to enable implementation of the methods described above (method for generating at least one cryptographic key and/or the method for deciphering encrypted data) in the various embodiment disclosed in relationship with FIG. 2 and FIG. 3.

Upon initialization, the aforementioned program code instructions are transferred from the non-volatile memory 503 to the volatile memory 501 so as to be executed by the processor 502. The volatile memory 501 likewise includes registers for storing the variables and parameters required for this execution.

All the steps of the method for generating at least one cryptographic key and/or the method for deciphering encrypted data according to the disclosure may be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

In some embodiments, the device 500 comprises the device 100.

In some embodiments, the device 500 is the device 100.

The invention claimed is:

1. A device for generating at least one cryptographic key, said device including at least one cryptographic element, the device comprising:

circuitry configured to implement at least one generation of a cryptographic key comprising:

selecting at least three input data, each of said at least three input data being selected among predetermined data and a function of at least one piece of data having a type belonging to a group comprising:

a physical unclonable type, corresponding to physical unclonable function data;

a hardwired type, corresponding to data hardwired within said device; and a software type, corresponding to software data, the predetermined data having a same size as the physical unclonable function data, the data hardwired within said device, and the software data;

after selecting said at least three input data, assembling said at least three input data to produce an assembled input data, a size of the assembled input data being constant regardless of whether the predetermined data is selected; and applying the assembled input data into a cryptographic element to produce said cryptographic key.

2. The device according to claim 1, wherein the circuitry is configured to implement three of said generation of a cryptographic key implemented successively for producing a sequence of three cryptographic keys, at least one cryptographic key of given rank in said sequence being a function at least of an input data selected among given predetermined data and a cryptographic key of a previous rank in said sequence.

3. The device according to claim 1, wherein the circuitry is configured to implement a first generation of a first cryptographic key comprising selecting at least three first input data being:

a first predetermined data or a first data of physical unclonable type;

a second predetermined data or a second data of said hardwired type; and a third predetermined data or a third data of said software type.

4. The device according to claim 3, wherein the circuitry is configured to implement a second generation of a second cryptographic key comprising selecting at least three second input data being:

a fourth predetermined data or a fourth data of said physical unclonable type;

a fifth predetermined data or said first cryptographic key; and a sixth predetermined data or a fifth data of said software type, wherein assembling said at least three second input data produces an assembled second input data, and wherein applying the assembled second input data into a second cryptographic element produces said second cryptographic key.

5. The device according to claim 4, wherein the circuitry is configured to implement a third generation of a third cryptographic key comprising selecting at least three third input data being:

a seventh predetermined data or a sixth data of said physical unclonable type;

an eighth predetermined data or said second cryptographic key; and a nineth predetermined data or a seventh data of said software type, wherein assembling said at least three third input data produces an assembled third input data, and wherein applying the assembled third input data into a third cryptographic element produces said third cryptographic key.

6. The device according to claim 5, wherein said first data, said fourth data and said sixth data are a same public data of said physical unclonable type.

7. The device according to claim 6, wherein said first generation of a first cryptographic key comprises selecting five first input data being said three first input data and:

a tenth predetermined data or a private data of said physical unclonable type; and an eleventh predetermined data or a private data of said hardwired type, wherein assembling said five first input data produces said assembled first input data.

8. The device according to claim 7, wherein said fifth data of said software type is different from said software data of said software type.

9. The device according to claim 1, wherein said cryptographic element implements a one-way function to produce said cryptographic key based on said input data.

10. A method for generating at least one cryptographic key by a device including at least one cryptographic element, the method comprising:

implementing, by circuitry of the device, at least one generation of a cryptographic key comprising:

selecting at least three input data, each of the at least three input data being selected among predetermined data and a function of at least one piece of data having a type belonging to a group comprising:

a physical unclonable type, corresponding to physical unclonable function data;

a hardwired type, corresponding to data hardwired within the device; and a software type, corresponding to software data, the predetermined data having a same size as the physical unclonable function data, the data hardwired within the device, and the software data;

after selecting the at least three input data, assembling the at least three input data to produce an assembled input data, a size of the assembled input data being constant regardless of whether the predetermined data is selected; and applying the assembled input data into a cryptographic element to produce the cryptographic key.

11. The method according to claim 10, wherein the implementing implements three of the generation of a cryptographic key implemented successively for producing a sequence of three cryptographic keys, at least one cryptographic key of given rank in the sequence being a function at least of an input data selected among given predetermined data and a cryptographic key of a previous rank in the sequence.

12. The method according to claim 10, wherein the implementing implements a first generation of a first cryptographic key comprising selecting at least three first input data being:

a first predetermined data or a first data of physical unclonable type;

a second predetermined data or a second data of the hardwired type; and a third predetermined data or a third data of the software type.

13. The method according to claim 12, wherein the implementing implements a second generation of a second cryptographic key comprising selecting at least three second input data being:

a fourth predetermined data or a fourth data of the physical unclonable type;

a fifth predetermined data or the first cryptographic key; and a sixth predetermined data or a fifth data of the software type, wherein assembling the at least three second input data produces an assembled second input data, and wherein applying the assembled second input data into a second cryptographic element produces the second cryptographic key.

14. The method according to claim 13, wherein the implementing implements a third generation of a third cryptographic key comprising selecting at least three third input data being:

a seventh predetermined data or a sixth data of the physical unclonable type;

an eighth predetermined data or the second cryptographic key; and a nineth predetermined data or a seventh data of the software type, wherein assembling the at least three third input data produces an assembled third input data, and wherein applying the assembled third input data into a third cryptographic element produces the third cryptographic key.

15. The method according to claim 14, wherein the first data, the fourth data and the sixth data are a same public data of the physical unclonable type.

16. A non-transitory computer-readable storage medium including computer executable instructions, wherein the instructions, when executed by a device, cause the device to perform a method for generating at least one cryptographic key, the method comprising:

implementing at least one generation of a cryptographic key comprising:

selecting at least three input data, each of the at least three input data being selected among predetermined data and a function of at least one piece of data having a type belonging to a group comprising:

a physical unclonable type, corresponding to physical unclonable function data;

a hardwired type, corresponding to data hardwired within the device; and a software type, corresponding to software data, the predetermined data having a same size as the physical unclonable function data, the data hard-wired within the device, and the software data;

after selecting the at least three input data, assembling the at least three input data to produce an assembled input data, a size of the assembled input data being constant regardless of whether the predetermined data is selected; and applying the assembled input data into a cryptographic element to produce the cryptographic key.

17. The non-transitory computer-readable storage medium according to claim 16, wherein the implementing implements three of the generation of a cryptographic key implemented successively for producing a sequence of three cryptographic keys, at least one cryptographic key of given rank in the sequence being a function at least of an input data selected among given predetermined data and a cryptographic key of a previous rank in the sequence.

18. The non-transitory computer-readable storage medium according to claim 16, wherein the implementing implements a first generation of a first cryptographic key comprising selecting at least three first input data being:

a first predetermined data or a first data of physical unclonable type;

a second predetermined data or a second data of the hardwired type; and a third predetermined data or a third data of the software type.

19. The non-transitory computer-readable storage medium according to claim 18, wherein the implementing implements a second generation of a second cryptographic key comprising selecting at least three second input data being:

a fourth predetermined data or a fourth data of the physical unclonable type;

a fifth predetermined data or the first cryptographic key; and a sixth predetermined data or a fifth data of the software type, wherein assembling the at least three second input data produces an assembled second input data, and wherein applying the assembled second input data into a second cryptographic element produces the second cryptographic key.

20. The non-transitory computer-readable storage medium according to claim 19, wherein the implementing implements a third generation of a third cryptographic key comprising selecting at least three third input data being:

a seventh predetermined data or a sixth data of the physical unclonable type;

an eighth predetermined data or the second cryptographic key; and a nineth predetermined data or a seventh data of the software type, wherein assembling the at least three third input data produces an assembled third input data, and wherein applying the assembled third input data into a third cryptographic element produces the third cryptographic key.

* * * * *